(12) United States Patent
Schneck

(10) Patent No.: US 6,565,772 B2
(45) Date of Patent: May 20, 2003

(54) CONDUCTIVE RESIN COMPOSITION

(75) Inventor: Thomas Schneck, Macomb Township, MI (US)

(73) Assignee: Midwest Thermal Spray, Farmington Hills, MI (US)

( * ) Notice: Subject to any disclaimer, the term of this patent is extended or adjusted under 35 U.S.C. 154(b) by 0 days.

(21) Appl. No.: 09/962,765

(22) Filed: Sep. 25, 2001

(65) Prior Publication Data

US 2003/0057402 A1 Mar. 27, 2003

(51) Int. Cl.$^7$ .............................. C08G 8/28; H01B 1/02
(52) U.S. Cl. ..................... 252/511; 252/512; 252/513; 252/514; 523/442; 523/468; 525/486; 525/507
(58) Field of Search .................... 252/512, 513, 252/514, 511; 523/442, 468; 525/486, 507

(56) References Cited

U.S. PATENT DOCUMENTS

| | | | |
|---|---|---|---|
| 4,273,686 A | | 6/1981 | Noland et al. ................. 260/9 |
| 5,908,881 A | * | 6/1999 | Sakamoto ................... 252/514 |
| 2002/0010287 A1 | * | 1/2002 | Ohashi et al. .............. 525/486 |

FOREIGN PATENT DOCUMENTS

| | | | |
|---|---|---|---|
| EP | 0 024 526 A2 | 3/1981 | |
| EP | 481228 | * 9/1991 | ........... C08G/59/40 |
| EP | 0 481 228 A2 | 4/1992 | |

* cited by examiner

*Primary Examiner*—Mark Kopec
*Assistant Examiner*—Kallambella Vijayakumar

(57) ABSTRACT

A conductive resin composition includes between 40 and 140 parts by weight of reactive epoxy resin, between 15 and 40 parts by weight of a reactive monofunctional glycidyl material, a cure accelerant, and 40 to 200 parts by weight of a conductive particulate material. The conductive resin composition forms a defect-free conductive coating on a substrate after mixing a one part epoxy resin composition under vacuum at a temperature insufficient to induce thermal cure. Adding a liquid epoxy resin to the one part epoxy resin composition to form a mixture combining 40 to 200 parts by weight of conductive particulate with the mixture and dispersing the combined conductive particulate and the mixture under vacuum until a homogeneous conductive resin paste results where the dispersing time for the combined conductive particulate and the mixture under vacuum is greater than or equal to the period of time of vacuum mixing the liquid one part epoxy composition.

19 Claims, No Drawings

CONDUCTIVE RESIN COMPOSITION

FIELD OF THE INVENTION

The present invention relates to a conductive resin composition and process for the preparation thereof, and more particularly, to a composition and mixing process that yields a conductive coating.

BACKGROUND OF THE INVENTION

In the construction of metal bodies, such as the metal bodies used by the automotive industry, bare metal sections, which ultimately form the automobile body, are welded together typically by spot welding or mig welding. Such welding inherently causes ripples, porosity and other deformations along the weld seam as a result of the welding operation.

There have been a number of previously known methods for obscuring or hiding the imperfections caused by the weld seam. Such imperfections must, of course, be minimized prior to painting the body. Otherwise, the imperfections will show through the finish and detract from the overall appearance of the finish.

One previously known method of hiding the welded joint in the metal body is to apply solder to the joint and then subsequently grind the joint to form a flush surface between the two body panels. Such soldering, however, is disadvantageous since it is time consuming and also economically unfriendly due to the toxicity of lead in the solder. Although current solders do not contain lead, they do not finish as well as solders containing lead.

A more modem approach to obscuring the weld seam between two metal body panels is known as applying conductive resin composition.

SUMMARY OF THE INVENTION

A conductive resin composition includes between 40 and 140 parts by weight of a reactive epoxy resin, between 15 and 40 parts by weight of a reactive monofunctional glycidyl material, a cure accelerant, and 40 to 200 parts by weight of a conductive particulate material. The reactive epoxy resin typically including solid particulate of the cure accelerant that upon heating melts to cure. The reactive epoxy resin is preferably a one part curable resin optionally containing fillers, pigments, and stabilizers. A process for preparing a homogeneous conductive resin paste includes the steps of mixing from 50 to 150 parts by weight of a one-part epoxy resin composition under vacuum and at a temperature insufficient to induce thermal cure. The one-part epoxy resin composition including a reactive epoxy resin, a reactive monofunctional glycidyl material and a cure accelerant. Thereafter, 1 to 10 parts by weight of a liquid epoxy resin are added to form a mixture that is combined with 40 to 200 parts by weight of conductive particulate. The combined conductive particulate and the mixture are dispersed under vacuum until a homogeneous conductive resin paste is reached. The dispersal time during which the conductive particulate and the mixture are dispersed is a time greater than or equal to the mixing time for the one part epoxy resin composition. The resulting homogeneous conductive resin paste thermally cures absent of defects. The homogeneous conductive resin paste being deposited onto a metal substrate and heated to induce cure of the conductive resin paste to form a defect-free epoxy coating.

DETAILED DESCRIPTION OF THE INVENTION

The present invention has utility as a protective coating that is electrically conductive and sufficiently uniform to yield a paintable surface. The inventive composition achieves a gloss coating of greater than 75 after a production paint overcoating. An inventive conductive resin composition includes an epoxy resin component present from between 40 and 150 parts by weight. Preferably, the epoxy resin component is present from 80 to 110 parts by weight. Preferably, the epoxy resin within the epoxy resin component is present from 60 to 80 parts by weight. Epoxy resins are detailed in the Kirk-Othmer Encyclopedia of Chemical Technology, Vol. 9, pages 267–289, $3^{rd}$ Edition. Epoxy resins operative in the present invention illustratively include the diglycidyl ether of bisphenol A, epoxy phenol novolak resins, tetraglycidyl ether of tetrakis (4-hydroxphenyl) ethane; N, N, N', N'-tetraglycidyl-4,4' diaminodiphenylmethane; triglycidyl isocyanurate, triglycidyl-paminophenol, diglycidyl ether of butane diol; 3,4-epoxycyclohexyloxirane, epoxycresol novolak (ECN) resins; resins derived from bisphenol A; epoxidized natural oils including epoxidized soybean oil; derivatives of tetraglycidyl methylene dianiline; derivatives of triazines such as triglycidyl isocyanurate and resins derived from the reaction of epichlorohydrin and a polyglycol.

An inventive conductive resin composition also includes between 15 and 40 parts by weight of a reactive monofunctional glycidyl material. The glycidyl material preferably being a monofunctional epoxy compound. More preferably, the monofunctional epoxy compound is an aliphatic glycidyl ether. Still more preferably, the aliphatic glycidyl ether has an aliphatic chain containing between 4 and 18 carbon atoms. Reactive glycidyl materials illustratively include butyl glycidyl ether, phenyl glycidyl ether and glycidyl methacrylate. It is appreciated that additional monofunctional epoxy compounds to those illustratively detailed herein are also operative. Preferably, the reactive glycidyl material is present from 15 to 25 weight percent.

A cure accelerant is also included within a conductive resin composition for inducing cure of the epoxy resin component and the reactive glycidyl material component. The cure accelerant used in the inventive conductive resin compositions is a compound which is an insoluble solid in the epoxy resin at room temperature yet is solubilized through heating to serve as a cure accelerant. A cure accelerant according to the present invention illustratively includes imidazole compounds that are solids at 25° C., and imidazole adduct materials produced through the reaction of imidazole compound with an epoxy species, or a solid imidazole adduct created by the reaction of an imidazole compound with an isocyanate or urea species. Typically, a cure accelerant is present from between 0.05 and 2 parts by weight of the total weight of an inventive conductive resin composition. It is appreciated that the amount of cure accelerant present is dependent upon factors illustratively including the molecular weight of the accelerant, the uncured resin composition, the cure accelerant particle size, cure accelerant solubilization temperature and epoxy resin solvent polarity.

An additional component of the inventive conductive resin composition is an electrically conductive particulate material. Preferably, the electrically conductive particulate material is present from 40 to 200 parts by weight. The conductive particulate material operative herein illustratively includes particulate of graphite, copper, silver, aluminum, iron, magnesium, turbostratic carbon, and alloys thereof. More preferably, the conductive particulate is present from 50 to 70 parts by weight. Where carbon particulate is present, it is appreciated that the particulate shape is largely immaterial and can include granular, spherical, dendritic, flake, irregular shapes or mixtures thereof. The load fraction of conductive particulate being dictated to exceed the percolation threshold thus allowing an electrical charge to traverse a portion of the cured resin through contacting particles.

The present invention also relates to a process for preparing a homogeneous conductive resin paste capable of curing to a gloss measurement of greater than 75 gloss units after a production paint overcoating. Gloss being measured with an Electrometer Model 405 gloss meter (Manchester, UK) operating on a 0–100 scale.

A process for preparing an inventive homogenous conductive resin paste includes mixing a one part epoxy resin composition including an epoxy resin, a reactive glycidyl material and a cure accelerant suitable for inducing thermal cure between the epoxy resin and glycidyl material components. The one part epoxy resin composition optionally contains fillers, pigments, stabilizers, or similar materials. The one part epoxy resin composition is mixed under vacuum conditions until gas bubbles are removed. While mixing times vary depending upon the size of the cure accelerant particulate and batch size, 1 to 6 hours is a typical time range to adequately degas the one part epoxy resin composition. Thereafter, 1 to 10 parts by weight of a liquid epoxy resin is optionally added to the degassed mixture in order to modify the viscosity of the uncured resin and/or to modify the flexibility characteristics of the resulting cured coating. Preferably, the liquid epoxy resin when present is added at 2 to 5 parts by weight. Ideally, no cure accelerants are included in the liquid epoxy resin, nor are there other forms of particulate dispersed therein. The resulting mixture of one part epoxy resin composition and liquid epoxy resin is stirred under vacuum until homogeneous and degassed as detailed above. It is appreciated that heat is associated with mechanical mixing, a cooling jacket is often required to prevent premature resin curing. Typically, the mixture of one part epoxy resin composition and liquid epoxy resin is mixed under vacuum for an additional thirty minutes to three hours until degassed and homogenized. The resulting mixture is combined with 40 to 200 parts by weight of conductive particulate and further mixed under vacuum until the mixture wets the conductive particulate. Upon fully mixing the conductive particulate into the mixture, a paste results that is suitable to application to a substrate. The substrate illustratively includes metal sheeting, especially those used in the construction of vehicle outer body panels such as cold-rolled steel, galvanized steel and aluminum. The inventive conductive resin composition paste is deposited in paste form, onto the metal surface. Heating of the metal surface to a temperature of about 300 to 400° F. is sufficient to cross-link the resin composition.

The following non-limiting example is provided to illustrate the practice of the instant invention.

Example 1

100 parts by weight of epoxy compound/sealant/adhesive containing curing agents, carbon black (accounting for less than 5 weight percent), epoxy resin accounting for greater than 70 weight percent (Shell 828), aliphatic glycidyl ether accounting for greater than 20 weight percent, and 2 methyl imidazole accounting for less than 2 weight percent. 100 parts by weight of epoxy compound is placed in a vacuum sealable mixer and mixed for three hours under vacuum with cooling applied to prevent premature cure. The vacuum is then broken and the mixing vessel charged with 6 parts by weight of epoxy resin DER 736 (The Dow Chemical Company). The mixing vessel is then re-evacuated and the mixture stirred for one additional hour. Thereafter, the vacuum is again broken and the mixing vessel is charged with 60 to 80 parts by weight of 60 mesh conductive carbon particulate. The mixing vessel is again re-evacuated and mixed for an additional five hours. It is noted after this mixing that the conductive particulate has been wet by the mixture. The resulting inventive conductive resin composition now has a paste-like consistency.

All references detailed herein are hereby incorporated by reference to the same extent as if each individual reference was individually and specifically incorporated by reference.

The foregoing description of illustrative of particular embodiments of the invention, but is not meant to be a limitation upon the practice thereof. The following claims, including all equivalents thereof, are intended to define the scope of the invention.

What is claimed is:

1. A conductive resin composition comprising:
   between 40 and 150 parts by weight of a reactive epoxy resin;
   between 15 and 40 parts by weight of a reactive monofunctional glycidyl material;
   a cure accelerant of said reactive epoxy resin and said reactive monofunctional glycidyl material; and
   a conductive particulate material selected from the group consisting of: 40 to 200 parts by weight carbon, 50 to 70 parts by weight copper, 50 to 70 parts by weight silver, 40 to 200 parts by weight aluminum, 40 to 200 parts by weight iron, 40 to 200 parts by weight magnesium, 40 to 200 parts by weight electrically conductive compounds thereof and 40 to 200 parts by weight of alloys thereof.

2. The composition of claim 1 wherein said reactive epoxy resin is present between 60 and 80 parts by weight.

3. The composition of claim 1 wherein said reactive monofunctional glycidyl material is present between 15 and 25 parts by weight.

4. The composition of claim 1 wherein said conductive particulate material is present from 60 to 65 parts by weight.

5. The composition of claim 1 wherein said conductive particulate material is carbon.

6. A process for preparing a homogeneous conductive resin paste, the process comprising the steps of:
   mixing from 40 to 150 parts by weight of a one part epoxy resin composition comprising a reactive epoxy resin, a reactive monofunctional glycidyl material and a cure accelerant suitable for inducing thermal cure, wherein mixing occurs under vacuum and at a temperature insufficient to induce thermal cure for a period of time;
   adding from 1 to 10 parts by weight of a liquid epoxy resin to form a mixture;
   combining a conductive particulate material selected from the group consisting of: 40 to 200 parts by weight carbon, 50 to 70 parts by weight copper, 50 to 70 parts by weight silver, 40 to 200 parts by weight aluminum, 40 to 200 parts by weight iron, 40 to 200 parts by weight magnesium, 40 to 200 parts by weight electrically conductive compounds thereof and 40 to 200 parts by weight of alloys thereof with the mixture; and
   dispersing the combined conductive particulate and the mixture under vacuum until a homogeneous conductive resin paste, wherein the conductive particulate and the mixture are dispersed for a time greater than or equal to the period of time of mixing the liquid one part epoxy composition to yield the homogeneous conductive resin paste that thermally cures absent defects.

7. The process of claim 6 wherein the one part epoxy resin composition is present from 80 to 110 parts by weight.

8. The process of claim 6 wherein mixing occurs with the use of a vacuum mixer.

9. The process of claim 8 wherein the period of time of mixing is greater than two hours.

10. The process of claim 6 wherein the liquid epoxy resin is independent of particulate therein.

11. The process of claim 6 wherein the liquid epoxy resin is added at between 2 and 5 parts by weight.

12. The process of claim 6 wherein the conductive particulate material is combined at between 50 and 70 parts by weight wherein the conductive particulate material is selected from the group consisting of: carbon, aluminum, iron, magnesium, electrically conductive compounds thereof and alloys thereof alone or containing silver or copper.

13. The process of claim 6 wherein the dispersing time that is greater than or equal to the period of time of mixing is greater than three hours.

14. The process of claim 9 wherein the dispersing time that is greater than or equal to the period of time of mixing is greater than four hours.

15. A conductive epoxy coating on a metallic substrate formed by the steps comprising:

preparing a homogeneous conductive resin paste according to claim 6;

depositing the paste onto the metal substrate; and heating the paste to a temperature sufficient to induce cure of the conductive resin paste to form an epoxy coating having a gloss over greater than 75 after painting.

16. The coating of claim 15 wherein the gloss is achieved through the steps comprising: curing the coating, finishing the coating; and overcoating the coating with production paint.

17. The coating of claim 15 wherein deposition is by an electro deposition coating process.

18. The coating of claim 15 wherein the metallic substrate is selected from the group consisting of:

cold rolled steel, galvanized steel, and aluminum.

19. The coating of claim 15 wherein the temperature to induce cure is between 300 and 400° F.

\* \* \* \* \*